United States Patent
Philp et al.

(10) Patent No.: US 7,937,193 B2
(45) Date of Patent: May 3, 2011

(54) METHOD AND APPARATUS FOR COORDINATING RAILWAY LINE OF ROAD AND YARD PLANNERS

(75) Inventors: Joseph Wesley Philp, Indialantic, FL (US); Mitchell Scott Wills, Melbourne, FL (US); Joanne Maceo, Rockledge, FL (US)

(73) Assignee: General Electric Company, Schenectady, NY (US)

( * ) Notice: Subject to any disclaimer, the term of this patent is extended or adjusted under 35 U.S.C. 154(b) by 1416 days.

(21) Appl. No.: 11/342,853

(22) Filed: Jan. 31, 2006

(65) Prior Publication Data
US 2006/0212184 A1 Sep. 21, 2006

Related U.S. Application Data

(63) Continuation-in-part of application No. 10/785,059, filed on Feb. 25, 2004, now abandoned.

(60) Provisional application No. 60/449,849, filed on Feb. 27, 2003.

(51) Int. Cl.
*B61L 27/04* (2006.01)
*B61L 17/00* (2006.01)
*B61L 23/00* (2006.01)
*G06F 17/00* (2006.01)

(52) U.S. Cl. ........... 701/19; 701/117; 701/200; 246/2 R; 246/6; 246/97

(58) Field of Classification Search ............... 701/19, 701/20, 117, 118, 200, 202; 340/955; 246/3, 246/13, 14, 2, 2 R, 6, 184, 97; 104/27; 705/8, 705/13, 7; 700/33, 36
See application file for complete search history.

(56) References Cited

U.S. PATENT DOCUMENTS

| | | |
|---|---|---|
| 3,575,594 A | 4/1971 | Elcan |
| 3,734,433 A | 5/1973 | Metzner |
| 3,794,834 A | 2/1974 | Auer, Jr. et al. |
| 3,839,964 A | 10/1974 | Gayot |
| 3,895,584 A | 7/1975 | Paddison |
| 3,944,986 A | 3/1976 | Staples |
| 4,099,707 A | 7/1978 | Anderson |
| 4,122,523 A | 10/1978 | Morse et al. |

(Continued)

FOREIGN PATENT DOCUMENTS

CA 2057039 12/1990

(Continued)

OTHER PUBLICATIONS

Mia Jia, et al. "Distributed Intelligent Railway Traffic Control Based on Fuzzy Decisionmaking" IEEE TENCON, 1993, pp. 333-337.*

(Continued)

*Primary Examiner* — Thomas G Black
*Assistant Examiner* — Christine Behncke
(74) *Attorney, Agent, or Firm* — Duane Morris LLP

(57) ABSTRACT

A scheduling system and method for moving plural objects through a multipath system described as a freight railway scheduling system. The scheduling system utilizes a resource scheduler to minimize resource exception while at the same time minimizing the global costs associated with the solution. The achievable movement plan can be used to assist in the control of, or to automatically control, the movement of trains through the system. Similar movement planners exist for moving trains in yards or terminals. Coordination is achieved and system efficiency improved by interfacing the line of road and yard planners.

6 Claims, 1 Drawing Sheet

U.S. PATENT DOCUMENTS

| | | | |
|---|---|---|---|
| 4,361,300 A | 11/1982 | Rush | |
| 4,361,301 A | 11/1982 | Rush | |
| 4,610,206 A | 9/1986 | Kubala et al. | |
| 4,669,047 A | 5/1987 | Chucta | |
| 4,791,871 A | 12/1988 | Mowll | |
| 4,843,575 A | 6/1989 | Crane | |
| 4,883,245 A | 11/1989 | Erickson, Jr. | |
| 4,926,343 A | 5/1990 | Tsuruta et al. | |
| 4,937,743 A | 6/1990 | Rassman et al. | |
| 5,038,290 A | 8/1991 | Minami | |
| 5,063,506 A | 11/1991 | Brockwell et al. | |
| 5,177,684 A | 1/1993 | Harker et al. | |
| 5,222,192 A | 6/1993 | Shaefer | |
| 5,229,948 A | 7/1993 | Wei et al. | |
| 5,237,497 A | 8/1993 | Sitarski | |
| 5,265,006 A | 11/1993 | Asthana et al. | |
| 5,289,563 A | 2/1994 | Nomoto et al. | |
| 5,311,438 A | 5/1994 | Sellers et al. | |
| 5,331,545 A | 7/1994 | Yajima et al. | |
| 5,332,180 A | 7/1994 | Peterson et al. | |
| 5,335,180 A | 8/1994 | Takahashi et al. | |
| 5,365,516 A | 11/1994 | Jandrell | |
| 5,390,880 A | 2/1995 | Fukawa et al. | |
| 5,420,883 A | 5/1995 | Swensen et al. | |
| 5,437,422 A | 8/1995 | Newman | |
| 5,463,552 A | 10/1995 | Wilson et al. | |
| 5,467,268 A | 11/1995 | Sisley et al. | |
| 5,487,516 A | 1/1996 | Murata et al. | |
| 5,541,848 A | 7/1996 | McCormack et al. | |
| 5,623,413 A | 4/1997 | Matheson et al. | |
| 5,745,735 A | 4/1998 | Cohn et al. | |
| 5,794,172 A | 8/1998 | Matheson et al. | |
| 5,823,481 A | 10/1998 | Gottschlich | |
| 5,825,660 A | 10/1998 | Cagan et al. | |
| 5,828,979 A | 10/1998 | Polivka et al. | |
| 5,850,617 A | 12/1998 | Libby | |
| 6,032,905 A | 3/2000 | Haynie | |
| 6,115,700 A | 9/2000 | Ferkinhoff et al. | |
| 6,125,311 A | 9/2000 | Lo | |
| 6,144,901 A | 11/2000 | Nickles et al. | |
| 6,154,735 A * | 11/2000 | Crone | 706/45 |
| 6,250,590 B1 | 6/2001 | Hofestadt et al. | |
| 6,351,697 B1 | 2/2002 | Baker | |
| 6,377,877 B1 | 4/2002 | Doner | |
| 6,393,362 B1 | 5/2002 | Burns | |
| 6,405,186 B1 | 6/2002 | Fabre et al. | |
| 6,459,965 B1 | 10/2002 | Polivka et al. | |
| 6,587,764 B2 | 7/2003 | Nickles et al. | |
| 6,637,703 B2 | 10/2003 | Matheson et al. | |
| 6,654,682 B2 | 11/2003 | Kane et al. | |
| 6,766,228 B2 | 7/2004 | Chirescu | |
| 6,789,005 B2 | 9/2004 | Hawthorne | |
| 6,799,097 B2 | 9/2004 | Antelo et al. | |
| 6,799,100 B2 | 9/2004 | Burns et al. | |
| 6,853,889 B2 | 2/2005 | Cole | |
| 6,856,865 B2 | 2/2005 | Hawthorne | |
| 6,961,682 B2 * | 11/2005 | Doner | 703/2 |
| 7,006,796 B1 | 2/2006 | Hofmann et al. | |
| 7,200,471 B2 * | 4/2007 | Kane et al. | 701/19 |
| 2001/0034642 A1 * | 10/2001 | Doner | 705/13 |
| 2002/0082814 A1 * | 6/2002 | Doner | 703/6 |
| 2003/0105561 A1 | 6/2003 | Nickles et al. | |
| 2003/0183729 A1 | 10/2003 | Root et al. | |
| 2004/0010432 A1 | 1/2004 | Matheson et al. | |
| 2004/0034556 A1 | 2/2004 | Matheson et al. | |
| 2004/0093196 A1 | 5/2004 | Hawthorne et al. | |
| 2004/0093245 A1 | 5/2004 | Matheson et al. | |
| 2004/0133315 A1 | 7/2004 | Kumar et al. | |
| 2004/0267415 A1 | 12/2004 | Lacote et al. | |
| 2005/0107890 A1 | 5/2005 | Minkowitz et al. | |
| 2005/0192720 A1 | 9/2005 | Christie et al. | |
| 2005/0234757 A1 * | 10/2005 | Matheson et al. | 705/8 |
| 2006/0074544 A1 | 4/2006 | Morariu et al. | |
| 2010/0235021 A1 * | 9/2010 | Muinonen et al. | 701/19 |

FOREIGN PATENT DOCUMENTS

| | | |
|---|---|---|
| CA | 2066739 | 2/1992 |
| CA | 2046984 | 6/1992 |
| CA | 2112302 | 6/1994 |
| CA | 2158355 | 10/1994 |
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 6/1973 |
| GB | 1321054 | 6/1973 |
| JP | 3213459 | 9/1991 |
| WO | WO 90/03622 | 4/1990 |
| WO | WO 93/15946 | 8/1993 |

OTHER PUBLICATIONS

Cuppari, et al. "Prototyping Freight Trains Traffic Management Using Multi-Agent Systems" IEEE International Conference on Information, Intelligence and Systems (1999).*

Shiwei, et al. "An integrated dispatching model for rail yards operations" Computers & Operations Research vol. 30, Issue 7, Jun. 2003, pp. 939-966.*

Crone, et al., "Distributed Intelligent Network Management for the SDI Ground Network," IEEE, 1991, pp. 722-726, MILCOM '91.

Ghedira, "Distributed Simulation Re-Annealing for Dynamic Constraint Satisfaction Problems," IEEE 1994, pp. 601-607.

Hasselfield, et al., "An Automated Method for Least Cost Distribution Planning," IEEE Transactions on Power Delivery, vol. 5, No. 2, Apr. 1990, 1188-1194.

Herault, et al., "Figure-Ground Discrimination: A Combinatorial Optimization Approach," IEEE Transactions on Pattern Analysis & Machine Intelligence, vol. 15, No. 9, Sep. 1993, 899-914.

Igarashi, "An Estimation of Parameters in an Energy Fen Used in a Simulated Annealing Method," IEEE, 1992, pp. IV-180-IV-485.

Komaya, "A New Simulation Method and its Application to Knowledge-based Systems for Railway Scheduling," May 1991, pp. 59-66.

Puget, "Object Oriented Constraint Programming for Transportation Problems," IEEE 1993, pp. 1-13.

Sasaki, et al., "Development for a New Electronic Blocking System," QR of RTRI, vol. 30, No. 4, Nov. 1989, pp. 198-201.

Scherer, et al., "Combinatiorial Optimization for Spacecraft Scheduling," 1992 IEEE International Conference on Tolls with AI, No. 1992, pp. 120-126.

Watanabe, et al., "Moving Block System with Continuous Train Detection Utilizing Train Shunting Impedence of Track Circuit," QR of RTRI, vol. 30, No. 4, Nov. 1989, pp. 190-197.

* cited by examiner

METHOD AND APPARATUS FOR COORDINATING RAILWAY LINE OF ROAD AND YARD PLANNERS

RELATED APPLICATIONS

This application is a continuation in part of application Ser. No. 10/785,059 filed Feb. 25, 2004 now abandoned, claiming the benefit of U.S. Provisional Application 60/449,849 filed on Feb. 27, 2003.

This application is also one of the below listed applications being concurrently filed:

GEH01 00166 application Ser. No. 11/342,856 entitled "Scheduler and Method for Managing Unpredictable Local Trains";

GEH01 00167 application Ser. No. 11/342,855 entitled "Method And Apparatus For Optimizing Maintenance Of Right Of Way"

GEH01 00169 application Ser. No. 11/342,875 entitled "Method And Apparatus For Selectively Disabling Train Location Reports";

GEH01 00170 application Ser. No. 11/342,854 entitled "Method And Apparatus For Automatic Selection Of Train Activity Locations";

GEH01 00171 application Ser. No. 11/342,874 entitled "Method And Apparatus For Congestion Management";

GEH01 00172 application Ser. No. 11/342,857 entitled "Method And Apparatus For Automatic Selection Of Alternative Routing Through Congested Areas Using Congestion Prediction Metrics"; and GEH01 00173 application Ser. No. 11/342,816 entitled "Method and Apparatus for Estimating Train Location".

The disclosure of each of the above referenced applications including those concurrently filed herewith is hereby incorporated herein by reference.

BACKGROUND OF THE INVENTION

The present invention relates to the scheduling of movement of plural units through a complex movement defining system, and in the embodiment disclosed, to the scheduling of the movement of freight trains over a railway system, and particularly to an interface between a line of road movement planner and a yard movement planner.

Systems and methods for scheduling the movement of trains over a rail network have been described in U.S. Pat. Nos. 6,154,735, 5,794,172, and 5,623,413, the disclosure of which is hereby incorporated by reference.

As disclosed in the referenced patents and applications, the complete disclosure of which is hereby incorporated herein by reference, railroads consist of three primary components (1) a rail infrastructure, including track, switches, a communications system and a control system; (2) rolling stock, including locomotives and cars; and, (3) personnel (or crew) that operate and maintain the railway. Generally, each of these components are employed by the use of a high level schedule which assigns people, locomotives, and cars to the various sections of track and allows them to move over that track in a manner that avoids collisions and permits the railway system to deliver goods to various destinations.

As disclosed in the referenced applications, a precision control system includes the use of an optimizing scheduler that will schedule all aspects of the rail system, taking into account the laws of physics, the policies of the railroad, the work rules of the personnel, the actual contractual terms of the contracts to the various customers and any boundary conditions or constraints which govern the possible solution or schedule such as passenger traffic, hours of operation of some of the facilities, track maintenance, work rules, etc. The combination of boundary conditions together with a figure of merit for each activity will result in a schedule which maximizes some figure of merit such as overall system cost.

As disclosed in the referenced applications, and upon determining a schedule, a movement plan may be created using the very fine grain structure necessary to actually control the movement of the train. Such fine grain structure may include assignment of personnel by name as well as the assignment of specific locomotives by number and may include the determination of the precise time or distance over time for the movement of the trains across the rail network and all the details of train handling, power levels, curves, grades, track topography, wind and weather conditions. This movement plan may be used to guide the manual dispatching of trains and controlling of track forces, or provided to the locomotives so that it can be implemented by the engineer or automatically by switchable actuation on the locomotive.

The planning system is hierarchical in nature in which the problem is abstracted to a relatively high level for the initial optimization process, and then the resulting course solution is mapped to a less abstract lower level for further optimization. Statistical processing is used at all levels to minimize the total computational load, making the overall process computationally feasible to implement. An expert system is used as a manager over these processes, and the expert system is also the tool by which various boundary conditions and constraints for the solution set are established. The use of an expert system in this capacity permits the user to supply the rules to be placed in the solution process.

Currently, a dispatcher's view of the controlled railroad territory can be considered myopic. Dispatchers view and processes information only within their own control territories and have little or no insight into the operation of adjoining territories, or the railroad network as a whole. Current dispatch systems simply implement controls as a result of the individual dispatcher's decisions on small portions of the railroad network and the dispatchers are expected to resolve conflicts between movements of objects on the track (e.g. trains, maintenance vehicles, survey vehicles, etc.) and the available track resource limitations (e.g. limited number of tracks, tracks out of service, consideration of safety of maintenance crews near active tracks) as they occur, with little advanced insight or warning.

The problem is particularly severe where the territories differ significantly in function. For example, terminals or yards exist with a number of receiving tracks or leads and a number of departure tracks or leads. Multiple car trains arrive on various receiving leads and are broken up and reformed into multiple car trains of departure leads. Coordination between the line-or-road dispatcher and the yardmaster to insure that an incoming train is received on a receiving line with access to the appropriate yard for the reconfiguration of the train. Likewise, the line-of-road dispatcher must know the departure line in order to plan the movement of the train after it leaves the yard.

As disclosed in the referenced applications, movement planners are available for planning the movement of trains within the various territories. Where one territory is a yard or a terminal, the line-of-road planning for the areas outside of the yard or terminal was necessarily independent of the planning for the terminal.

The movement planner for the line-of-road and the yard have been completely independent with communication between the yard master and the dispatcher typically accomplished on an ad hoc basis using radio or telephone as an issue arose. Such communication does not allow for sufficient coordination between the planned movement of the cars in the yard and the planned movement of the trains in the line of road to optimize the movement of the trains through the railway network.

Moreover, the yardmaster's movement plan is based on scheduled arrival and departure times, and updated information is generally not communicated to the yardmaster as the trains approach the terminal and often require significant revision. As a result, the use of yard resources has been inefficient. Likewise, the first accurate indication as to when a train is to be released to a line-of-road dispatcher is generally a telephone call from the yardmaster indicating that the train has been assembled and is ready for departure. Inefficiencies result from the change in the assignment of resources as is required by any departure from the anticipated departure time.

More importantly, information line-of-road dispatchers deliver trains to a terminal without regard to terminal capacity, car connection requirements or congestion within the yard, and are generally evaluated on the speed with which trains are moved across the line-of-road. As a result, trains are often delivered to congested terminals by line-of-road dispatchers resulting in increased congestion and exacerbating the yardmaster's problems in reconfiguring the trains. A delay in the delivery of the train to the terminal may permit the yardmaster to operate more efficiently within the yard and improve overall system efficiency. This delay may also permit the use of road resources by other trains increasing the throughput of the system.

Yardmasters are evaluated on the basis of the speed of assembly of trains within the yard without regard to road conditions or congestion, and often assemble trains for delivery to the line-of-road dispatcher without regard to the congestion of the road, exacerbating the dispatcher's problems in moving the trains. A delay in the delivery of a newly constructed train to the line-of-road may permit the line-of-road dispatcher to operate more efficiently and improve overall system efficiency. Knowing that little is gained by rushing the assembly of a particular train, the yardmaster may assign yard resources to other trains increasing the efficiency of the yard and the throughput of the system. In such a situation, a high value car may not get priority in the yard if the line-of-road exiting the terminal is congested.

It is accordingly an object of the present invention to increase the coordination between the line-of-road and terminal planning systems through electronic connection, reducing voice communications and obviating the interruption of the respective dispatchers. The electronic connection of the movement planners results in continuously updated information and improved planning for both line-of-road and yard movement of trains, increasing the profitability of the overall transportation system.

These and many other objects and advantages of the present invention will be readily apparent to one skilled in the art to which the invention pertains from a perusal of the claims, the appended drawings, and the following detailed description of the preferred embodiments.

DETAILED DESCRIPTION

Figure 1:
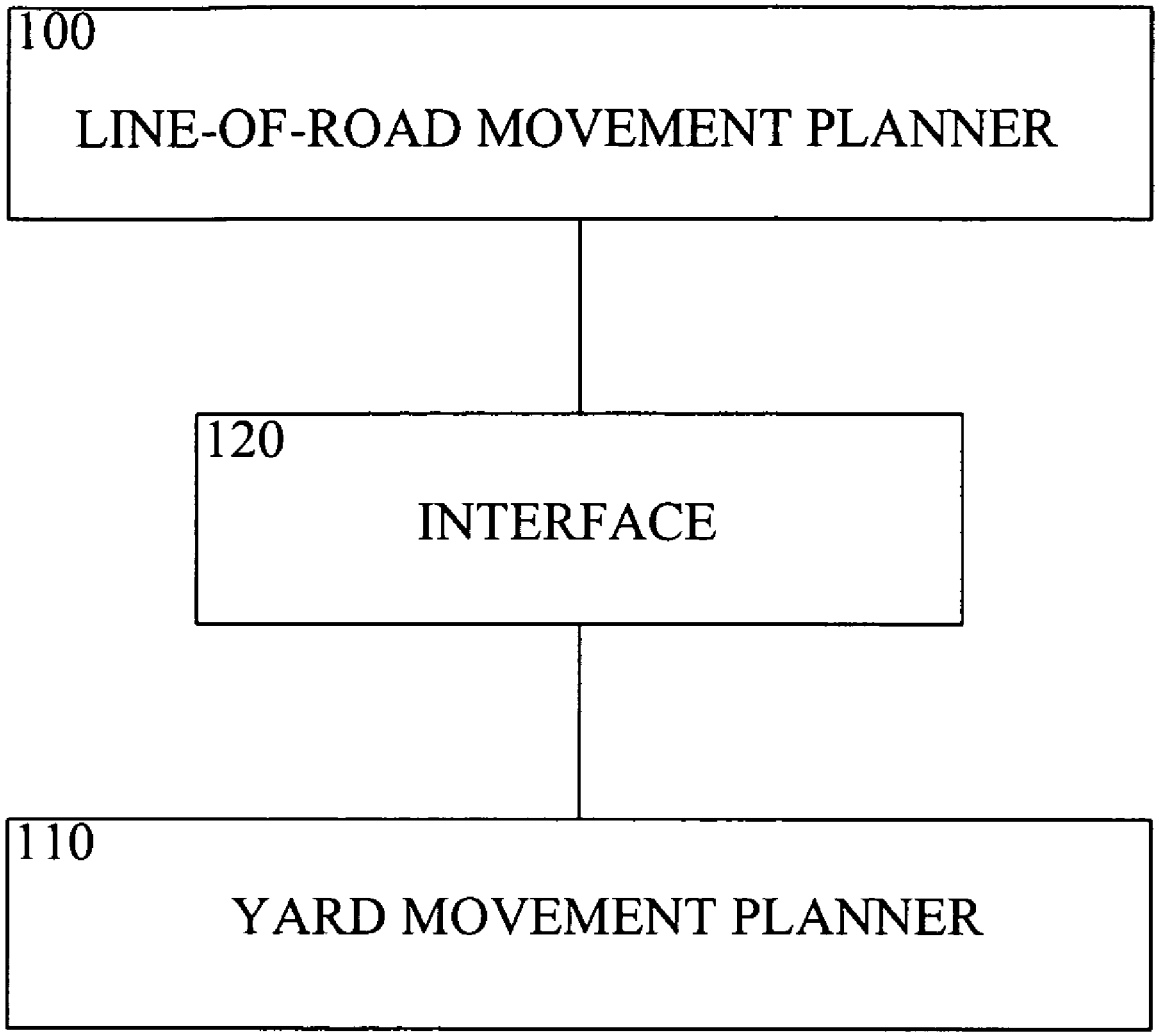
FIG. 1 is a functional block diagram illustrating the interface between the movement planner for the line-of-road and the movement planner for the yard.

The apparatus disclosed in the referenced applications may be used in the performance of the methods disclosed herein. Alternatively, and suitable conventional electronic interface may be employed so long as it has the capability of receiving output information from one movement planner and providing as input information to the other planner.

With reference to FIG. 1, a line-of-road movement planner 100 and a yard movement planner 110 may be provided as described in the referenced applications. Information, e.g., as to arrival times and arrival track information from the line-of-road planner 100 is desirably continuously passed to the yard planner 110 through the interface 120 where it may be displayed in a conventional manner to the yardmaster and/or automatically used by the yard movement planner 110.

Departure times and departure track information from the yard planner 110 is desirably continuously passed to the line-of-road planner 100 through the same electronic interface 120 where it may be displayed in a conventional manner to the line-of road dispatcher and/or automatically used by the line-of-road planner 100.

Status information as to the congestion of the yard and the road is useful to the planning process as it facilitates the identification of the activities required to move plural trains through the network of track and the assignment of resources to each of the identified activities. Both movement planners 100 and 110 may operate in the manner disclosed in the referenced applications to optimizing movement of the trains through the system as a function of cost of the identified activities and assigned resources.

A railyard may include a number of sub yards with each sub yard designed to perform specific tasks. A train is that has not entered the rail yard is typically under the control of a line of road movement plan being executed by a dispatcher. As the train enters the railyard, the responsibility for the movement of the train is passed to railyard personal. The railyard personal will control the movement of the train pursuant to a railyard movement plan executed by a railyard planner. The railyard movement plan is different than the line of road movement plan in that the line of road movement plan considers a train as a single entity and plans the use of resources to move the train without conflict through the rail network. In the railyard, the train is divided into individual cars each being scheduled for specific tasks at specific locations and planned to be reconnected with other cars for a common destination in the rail network. Thus, because the line of road planner and the railyard planner are responsible for scheduling different entities no attempt has been made at passing information between the line of road planner and the yard planner to optimize the movement of the trains through the rail network.

One typical configuration of a railyard includes a receiving yard for receiving a train from a network of tracks. The receiving yard is one or more sets of track to receive the train and permit the railyard personal to inspect the train. Once the inspection is complete the locomotives are detached from the railcars and further inspection and maintenance is accomplished. The railcars are moved to the hump yard for classification. The hump yard includes a hill which feeds into a receiving bowl which allows the individual rail cars to be push to the hump and then gravity fed to the appropriate receiving bowl. A series of switches down stream of the hump, control the delivery of each car to its respective track. The railcars are classified in blocks of common destination. Once the railcars are classified in blocks, they are moved as blocks to the destination yard where each car is directed to a classification track based on its subsequent destinations. At the destination yard the cars are inspected and the train consist is brake tested and powered up. Thus, in one or more of the designated activities areas, congestion may develop in the yard. The yard planner in the present application can identify the congestion and evaluate the trains approaching the yard on the line of road through interface 120. It may be advantageous to hold an approaching train outside the yard if the activity locations for that train's cars are not available. In another embodiment, the yard planner 110 can interface with the line of road planner 100 communicating that the yard is ready to receive a train that is further away rather than a train that is closer to the yard due to a specific condition of the yard. Thus the line of road movement planner 100 can make adjusts to its movement plan to alter the arrival sequence of the trains at the yard.

In another embodiment, the line of road planner 100 may have planned the sequential departure of two trains from the yard. If the first train scheduled to depart is held up because of a problem with one of its cars, the yard planner 110 can inform the line of road planner 100 through interface 120 that the second scheduled train will be ready before the first train so that the line of road planner 100 can switch the sequence of the departure of the trains. Alternately, the line of road planner 100 can communicate to the yard planner 110 that the first scheduled train is more critical due to an operating constraint and thus the sequence of departure will remain the same even though the second train is ready for departure before the first train.

In another embodiment of the present application, a model of the yard terminal can be created to assist in the prediction of the movement of the railcars through the yard in lieu of a separate planner for the yard. Such a model can estimate when the yard is available to accept and depart trains, based on the current and planned dynamic movement of the trains from and to the line of road. The model may include terminal capacity, yard capacity, inbound yard dwell, outbound yard train dwell, default yard or track resource allocation. Capacity may be mathematically modeled as one or more queues and individual track resources may be aggregated into a single track or queue for modeling. A mathematical model of the terminal provides an estimate of the capacity of the yard which can then be used to adjust the line of road plan, without the cost and complexity of a detailed terminal planner and without determining the actual terminal activities.

While preferred embodiments of the present invention have been described, it is understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A railway scheduling system for scheduling the movement of trains through a rail network having line of road track and yard tracks comprising
    a movement planner for a rail yard for scheduling the movement of cars through the yard, each car having an incremental cost associated with it, the yard movement planner optimizing the total costs of the movement of the cars through the yard, wherein the yard movement planner provides a schedule for individual cars of a specific train to perform specific tasks at specific locations in the rail yard and evaluates the specific locations to determine availability of the specific location; and
    an interface for communicating information about determined availability at a specific location in the yard for the specific train to a line of road movement planner to optimize the total costs of the movement of the trains through the rail network;
    wherein the movement planner for the line of road is configured for scheduling trains over the line of road, each train having an incremental cost associated with it, the line of road movement planner optimizing the total cost of the movement of the trains over the line of road, wherein the line of road movement planner schedules the movement of the specific train as a function of the determined availability at a specific location in the yard.

2. The system of claim 1 wherein the line of road movement planner delays the movement of the specific train into the yard in response to the communication from the yard movement planner.

3. The system of claim 1 wherein the line of road movement planner alters an arrival at the yard of a sequence of trains as a function of the scheduling of the selected train.

4. A method for scheduling the movement of trains through a rail network having line of road track and yard tracks comprising:
    scheduling the movement of cars through a rail yard using a movement planner for the rail yard, each car having an incremental cost associated with it, the yard movement planner optimizing the total costs of the movement of the cars through the yard, wherein the yard movement planner provides a schedule for individual cars of a specific train to perform specific tasks at specific locations in the rail yard and evaluates the specific locations to determine availability of the specific locations;
    communicating information about determined availability at a specific location in the yard for the specific train to a line of road movement planner to optimize the total costs of the movement of the trains through the rail network; and
    scheduling trains over the line of road using the line of road movement planner, each train having an incremental cost associated with it, the line of road movement planner optimizing the total cost of the movement of the trains over the line of road, wherein the line of road movement planner schedules the movement of the specific train as a function of the determined availability at the specific location in the yard.

5. The method of claim 4, wherein the specific location in the yard includes at least one of receiving track, hump track, maintenance track and classification track.

6. The method of claim 4 wherein the line of road movement planner alters an arrival at the yard of a sequence of trains as a function of the scheduling of the selected train.

* * * * *